United States Patent [19]
Bouthors et al.

[11] 3,741,024
[45] June 26, 1973

[54] ELECTRIC MOTOR AND REDUCTION GEARING UNIT

[75] Inventors: Pierre Bouthors; Andre Lefeuvre, both of Billancourt, France

[73] Assignees: Regie Nationale Des Usines Renault, Billancourt, (Hauts de Seine) Automobiles Peugeot, Paris, both of France

[22] Filed: Nov. 1, 1971

[21] Appl. No.: 194,731

[30] Foreign Application Priority Data

Nov. 5, 1970 France.......................7039802

[52] U.S. Cl................................... 74/220, 49/349
[51] Int. Cl........ F16h 9/04, E05f 15/16, E05f 15/08
[58] Field of Search............................ 74/220, 802; 248/358 R; 49/349, 350, 351, 334

[56] References Cited
UNITED STATES PATENTS

| | | | |
|---|---|---|---|
| 2,580,311 | 12/1951 | Matchett........................... | 74/220 X |
| 2,609,691 | 9/1952 | Kirwan........................ | 248/358 R X |
| 3,022,064 | 2/1962 | Russell............................. | 49/349 X |
| 3,314,631 | 4/1967 | Whitehill..................... | 248/358 R X |
| 3,337,165 | 8/1967 | Kondo........................ | 248/358 R X |

*Primary Examiner*—Leonard H. Gerin
*Attorney*—Richard K. Stevens, Davidson C. Miller et al.

[57] ABSTRACT

This unit comprises an electric motor having a flat case suspended through elastic means from a plate and rigid with an annular collar embedded in a corresponding annular bead of flexible material capable of absorbing vibration and fastened to said plate, a gear reduction mechanism driving the control mechanism and a flexible transmission between the motor and the reduction gearing, said transmission operating in conjunction with said bead for eliminating any rigid connection likely to propagate or amplify noise from said motor. This unit is intended more particularly for the remote control of a movable member of a vehicle, for example a window regulator.

6 Claims, 4 Drawing Figures

ELECTRIC MOTOR AND REDUCTION GEARING UNIT

This invention relates to a reduction gearing of the mechanical type driven from an electric motor and constituting a particularly compact and flat unitary structure of reduced overall dimensions, so that it can be used for special purposes, notably in the automotive industry.

This motor and reduction gearing unit may be housed for example in a door of motor vehicle so as to be incorporated in a window regulator adapted to be remote-controlled. It is also adapted to be mounted against the inner surface of the roof of a vehicle for controlling, also remotely, the opening and closing of a sliding roof panel. Similarly, a mechanism of this character may be used for controlling retractable or collapsible headlamps and other elements.

Electric control units closely associated with window regulator or other mechanisms are already known. These units are generally objectionable on account of their high cost and also because they constitute a far from negligible source of noise due to the vibration generated by the want of balance of the motors employed therein, such vibration being transmitted to and amplified by the body of the vehicle.

It is the essential object of the present invention to provide an electric driven power and reduction unit adapted to avoid the above-mentioned inconveniences by utilizing a sturdy, economical, manually-controlled mechanism, associated with an electric motor and a minimum number of transmission members. The motor constituting an essential element in the final cost of the assembly is selected to be sturdy and of relatively low cost, and suitable means are provided for elminiating or at least minimize the noise generated by this motor.

This motor and reducing unit mounted on a common plate with a control mechanism is characterized essentially in that it comprises on the one hand a relatively flat electric motor suspended resiliently from said plate and having its case rigid, to this end, with an annular collar embedded in a corresponding annular bead of flexible material adapted to absorb vibration and attached to the plate, and on the other hand a reduction gearing driving the control mechanism, and a flexible transmission (connecting the motor to the reduction gearing) operates in conjunction with said bead for eliminating between the motor and the vehicle body any rigid connection likely to propagate and amplify the noise produced by said motor.

Other features and advantages of this invention will appear as the following description proceeds with reference to the attached drawing illustrating diagrammatically by way of example a typical form of embodiment of a motor and reduction unit associated with a window regulator. In the drawing.

Figure 1:
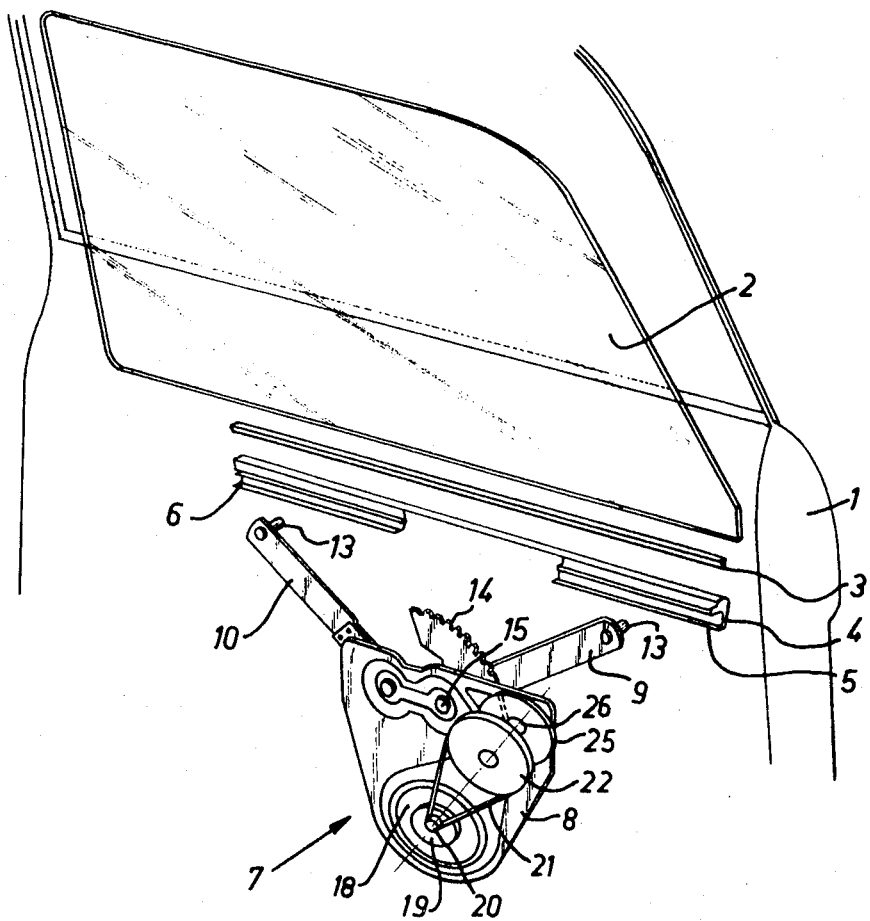
FIG. 1 is a perspective and partially exploded view showing the device associated with the door window regulator of an automotive vehicle.
Figure 2:
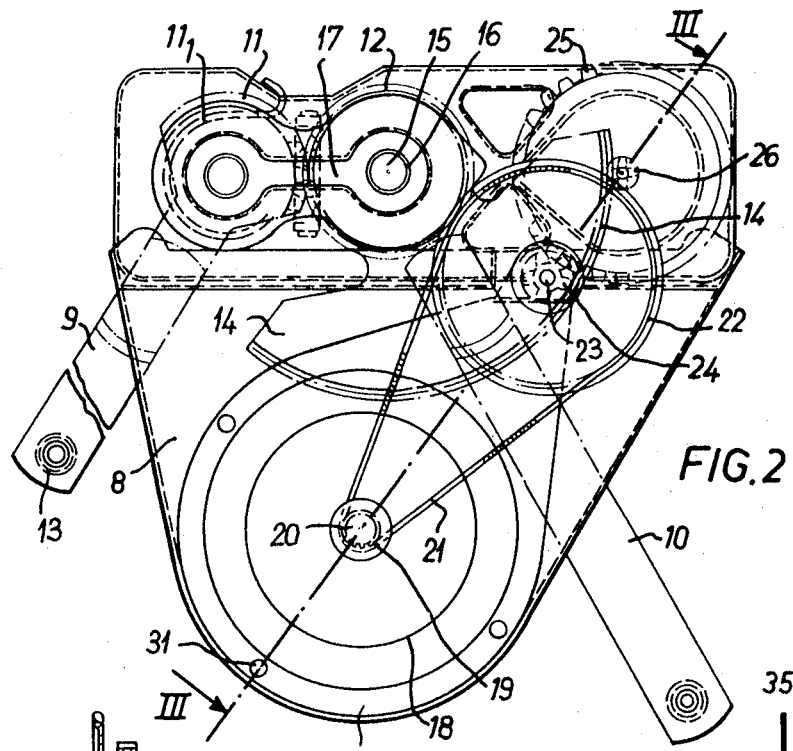
FIG. 2 is an elevational view showing on a larger scale the complete device.
Figure 3:
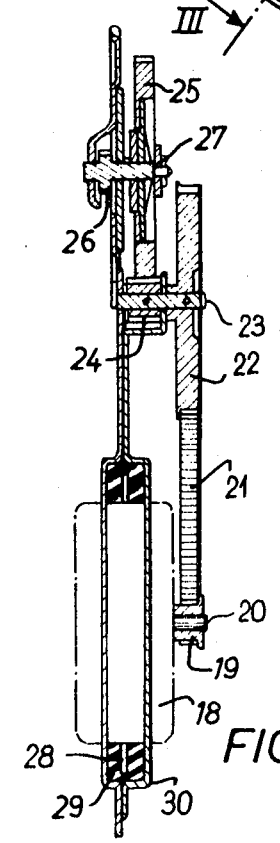
FIG. 3 is a cross sectional view taken along the line III—III of FIG. 2.

Referring to FIG. 1, the reference numeral 1 designates the door of a motor vehicle having a glass window 2, and a rubber strip or moulding 3 interposed during the assembling between the glass 2 and a fitting 4 provided with camplates or slideways 5 and 6. The window regulator 7 mounted on a plate 8 secured in the door panel comprises two lifting arms 9 and 10 having one end rigidly connected to meshing toothed wheels 11 and 12, as shown in FIG. 2, and the other end provided with rollers 13 engaging said camplates 5 and 6, respectively. The toothed wheels 11 and 12 revolve in opposite directions, against the force of spiral balance springs (of which only one is shown partially at $11_1$), under the control of a toothed segment 14 keyed to the shaft 15 of toothed wheel 12. The shafts 15 of said toothed wheels 11 and 12 are journalled in bearings 16 fitted at one end in said plate 8 and interconnected at the other end by a distance-piece 17. The toothed segment 14 is driven from an electric motor 18 via the following kinematic chain, shown in FIGS. 2 and 3 : small pinion 19 keyed to the output shaft 20 of motor 18, cogged belt 21, large toothed wheel 22 keyed to a shaft 23 rigid with a coaxial pinion 24, toothed wheel 25 driving a coaxial pinion 26 via a friction-type torque limiter 27 becoming operative at the end of the glass travel or in case of accidental jamming of the device. In lieu of the torque limiter 27, or in combination therewith, a thermal cutout may be provided (not shown).

The case of motor 18 comprises a flat annular collar 28 embedded in an annular bead 29 of flexible material such as natural or synthetic elastomer, filling a corresponding annular cavity 30 secured to the plate 8 by means of screws 31. The cogged belt 21 and pinions or pulleys 19 and 22 are preferred to plain ones to avoid possible slipping due to the elastic suspension of motor 18.

Figure 4:
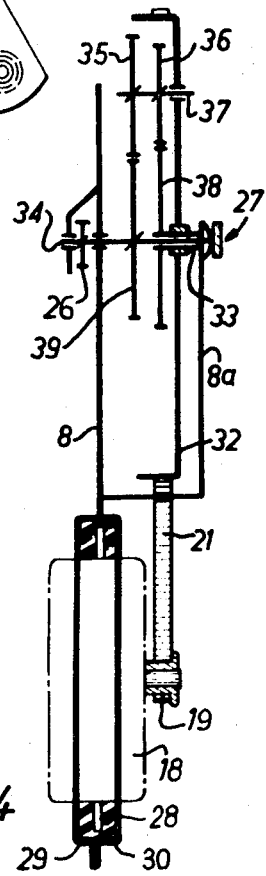
FIG. 4 is a modified view of the assembly shown in FIG. 3.

FIG. 4 illustrates a modified form of embodiment of the above-described kinematic reduction system, which leads likewise to a flat structure of the motor and reduction unit. This kinmatic system comprises in this case :

A small pinion 19 keyed to the output shaft of motor 18, driving via a cogged belt 21 the corresponding reduction externally toothed annulus 32 constituting the planet-carried of an epicyclic train. This externally toothed planet carrier 32 is mounted for loose rotation on a sleeve 33 coaxial to a shaft 34 carrying a pinion 26 controlling the window regulator proper. Planet pinions 35 and 36 mounted on and rigid with a common hollow shaft revolve about a concentric shaft 37 rigid with the disk of planet carrier 32. Planet pinion 36 reacts with a fixed sun wheel 38 carried by the sleeve 33 secured to a bracket $8a$ rigid with the plate 8. The shaft 34 is driven from a pinion 39 keyed to this shaft. A friction type torque limiter 27 is disposed on shaft 34, for example on the right-hand side of bracket $8a$, as shown in FIG. 4.

The above-described arrangement operates as follows :

When energized the motor 18 drives the toothed segment 14 through one of the kinematic chains described hereinabove. The glass 2 being assumed to be in its lowermost position, the arms 9 and 10 are in the position shown in FIG. 2. Starting the motor 18 will therefore raise the arms 9, 10 towards the uppermost position shown in FIG. 1, thus raising the glass 2, the rollers 13 being reciprocated in the slideways of camplates 5 and 6.

The noise developed by the electric motor 18 is not transmitted to the window regulator and to the vehicle body, due to the elastic suspension comprising the annular collar 28 and the transmission through the cogged belt 21.

Of course, this invention should not be construed as being strictly limited to the specific examples described and illustrated herein, since equivalent means having different shapes and relative arrangments could be used for the same purpose without departing from the basic principle of the invention as set forth in the appended claims.

What is claimed as new is :

1. Electric-driven, flat motor and reduction gearing unit for the remote control of a movable member of a vehicle, said unit being adapted to be mounted on a common plate supporting the control mechanism proper, characterized in that it comprises on the one hand an electric motor having a flat case suspended through elastic means from said plate and rigid to this end with an annular collar embedded in a corresponding annular bead consisting of a flexible material adapted to absorb vibration and attached to said plate, and on the other hand a reduction gearing adapted to drive said control mechanism, and a flexible transmission connecting th1 motor to the reduction gearing and acting in conjunction with said flexible annular bead for eliminating between said motor and the vehicle body any rigid connection likely to propagate and amplify the noise produced by said motor.

2. Motor and reduction gearing unit according to claim 1, wherein said annular bead consists of natural or synthetic elastomeric material.

3. Motor and reduction gearing unit according to claim 1, wherein the flexible trasmission consists of a cogged belt to avoid possible slip due to the elastic motor suspension.

4. Motor and reduction gearing unit according to claim 1, wherein the reduction gearing comprises a friction-type torque limiter enabled to become operative at the ends of the permissible stroke of the controlled mechanism and in case of accidental jamming of this mechanism.

5. Motor and reduction gearing unit according to claim 1, wherein said reduction unit is of the epicyclic train type comprising planet pinions rigid and concentric to each other, carried by a receiving or driven pulley of the flexible transmission, and meshing with a pair of coaxial sun wheels, respectively, one of them being stationary.

6. Motor and reduction gearing unit according to claim 1, wherein the reduction gearing comprises a thermal cutout enabled to become operative at the ends of the permissible stroke of the controlled mechanism and in case of accidental jamming of this mechanism.

* * * * *